Nov. 20, 1956  S. B. PICKLES ET AL  2,771,603
INSTRUMENT LANDING SYSTEMS

Filed Jan. 13, 1953  3 Sheets-Sheet 1

INVENTORS
SIDNEY B. PICKLES
ANTHONY M. CASABONA
BY
Ernest Fanwick
ATTORNEY

INVENTORS
SIDNEY B. PICKLES
ANTHONY M. CASABONA
BY
ATTORNEY

INVENTORS
SIDNEY B. PICKLES
ANTHONY M. CASABONA

2,771,603

Patented Nov. 20, 1956

2,771,603

INSTRUMENT LANDING SYSTEMS

Sidney B. Pickles, Tarrytown, and Anthony M. Casabona, Hawthorne, N. Y., assignors to International Telephone and Telegraph Corporation, a corporation of Maryland Application January 13, 1953, Serial No. 331,090

8 Claims. (Cl. 343—108)

This invention relates to improvements in instrument landing systems and more particularly to an improved null type glide path for use in an instrument landing system.

One of the objects of this invention is to provide means to modify a null type glide path for improved use with an instrument landing system.

Another object of this invention is to provide an instrument landing system having a modified glide path which maintains ample clearance and sharpness below the desired path angle.

A further object of this invention is to provide an instrument landing system having a modified glide path wherein the sharpness is reduced or "softened" as the aircraft approaches the landing area.

A feature of this invention is the addition of an antenna or antennas generally disposed above the basic glide path antenna array and which emits only sideband energy to improve the glide path signal pattern.

Figure 1:
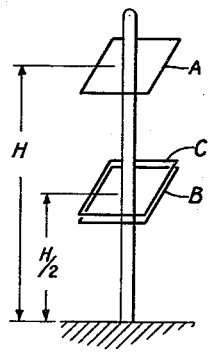
Figure 2A:
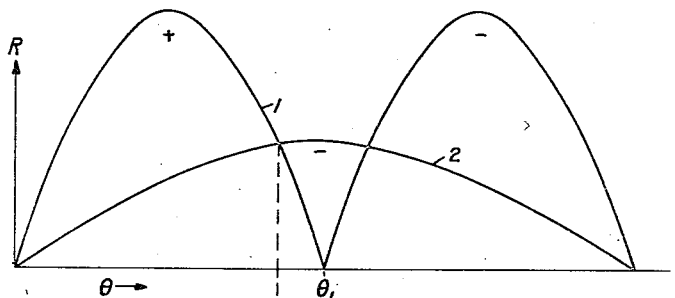
Figure 2B:
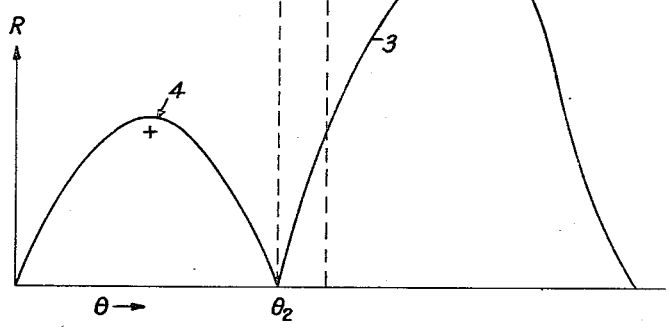
Figure 3:
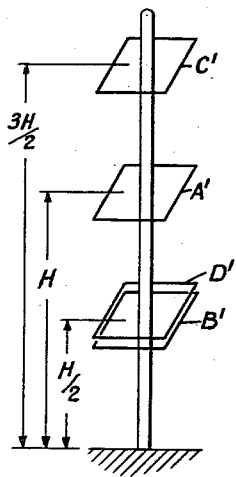
Figure 5:
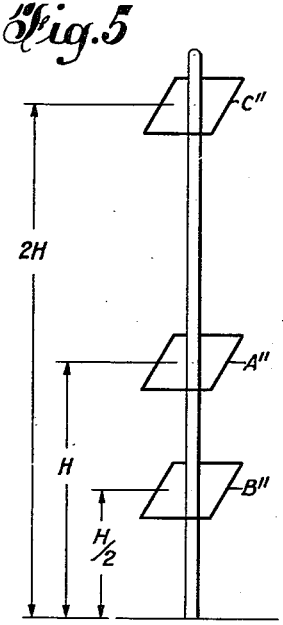
Figure 7:
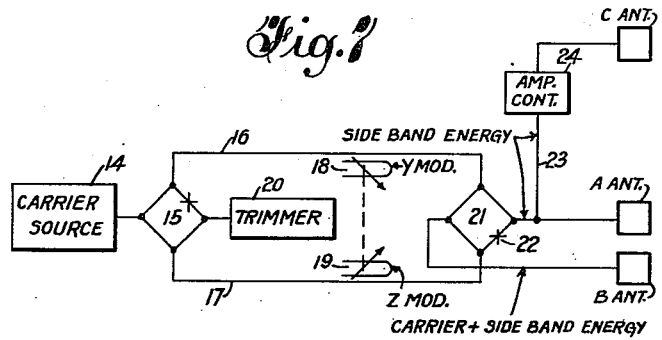

The above-mentioned and other features and objects of this invention will become more apparent by reference to the following description taken in conjunction with the accompanying drawings, in which:

Fig. 1 diagrammatically represents the antenna structure of a known glide path instrument landing system;

Figs. 2A and 2B are graphic illustrations of the signal strength R plotted as a function of the elevation angle $\theta$ for illustrating the glide path pattern of the prior art system;

Figs. 3 and 5 diagrammatically represent antenna structures suitable for use in accordance with this invention;

Figs. 4A, 4B, and 4C and 6A and 6B are graphic illustrations of signal strength R plotted as a function of elevation angle $\theta$ for illustrating features of this invention when used with the antenna structures of Fig. 3 and Fig. 5, respectively; and Fig. 7 is a schematic diagram in block form of one embodiment of the transmitter circuitry for use with the antenna structures of Figs. 3 and 5 to produce the radiation patterns illustrated in Figs. 4A, 4B, 4C and 6A, 6B, respectively.

The basic null type glide path instrument landing system utilizes an antenna structure of the so-called vertical type to set up radiation fields suitable for instrument landing purposes. Referring to Fig. 1, an antenna system defining the basic glide path comprises antennas A and B disposed one above the other. According to this known prior art system, the lower antenna B radiates a carrier frequency plus balanced sidebands of two audio modulations 90 and 150 C. P. S. The upper antenna A radiates balanced sidebands only, and the glide path position occurs at the null of this upper antenna. It has been found that this prior art system provides a glide path which has some undesirable features, such as the inability to modify the path shape by adjustment of the horizontal patterns of the radiators, as may be done with equi-signal type glide paths of former design. A flare out, or decrease in path angle as the aircraft approaches the landing area is considered essential for safe instrument approaches to actual contact with the ground. Systems heretofore presented modify the path shape at the expense of sharpness and clearance below the path.

It has been proposed heretofore to correct these undesirable characteristics of the prior art or basic glide path system by radiating additional sideband energy from a third antenna C in the immediate vicinity of the carrier antenna B.

Referring to Fig. 2A, curve 1 illustrates the radiation signal strength R plotted as a function of elevation angle $\theta$ for the sideband pattern as normally radiated by the upper antenna A of the prior art null type glide path system. The improvement heretofore proposed consisted of emitting the additional sideband energy from antenna C which was preferably situated at one-half the height above ground as antenna A. The vertical pattern of this modifier radiation is shown as curve 2 in Fig. 2A. The resulting total sideband pattern produced by this modification is illustrated in Fig. 2B, curve 3. The original glide path which was located at elevation angle $\theta_1$ was lowered to angle $\theta_2$ when the modifier radiation 2 was added to radiation 1. It will be observed that as the magnitude of the modifier pattern 2 increases with respect to the sideband pattern 1, $\theta_2$ drops further below the original glide path elevation angle $\theta_1$. Fig. 2B also illustrates that when the modifier signal 2 was added to the sideband radiation 1 from antenna A, the clearance and sharpness below the path decreased, i. e. loop 4 became smaller in radiated signal strength and had a more gentle slope than loop 5, which is above the desired glide path. Although the addition of the modifier signal produces a desired flare out, it is not completely satisfactory because the safety of the airplanes utilizing the instrument landing system required that the sharpness of the pattern be more apparent below rather than above the desired elevation angle.

Figure 4A:
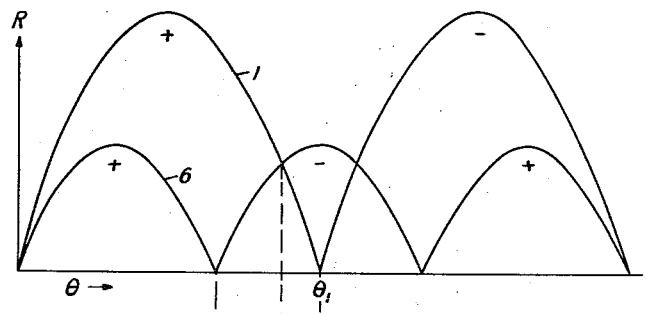
Figure 4B:
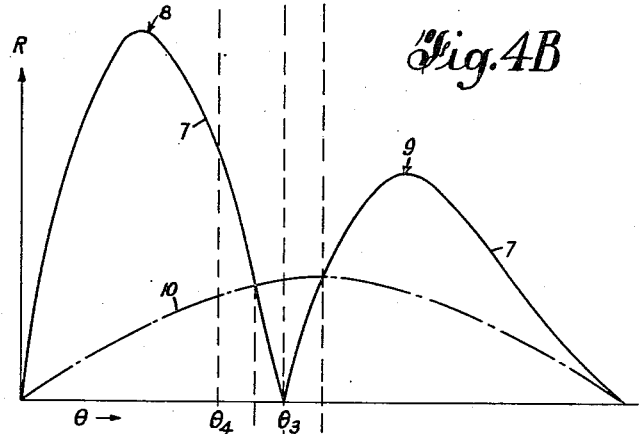

We have discovered that the addition of a third antenna generally disposed above the antennas of the basic array provides a great improvement in the radiation pattern of either the basic or the previously improved null type glide path system. Referring to Fig. 3, antennas A' and B' form the antenna array of a basic null type glide path system and are fed in a manner heretofore explained. Fig. 4A, curve 1, illustrates the sideband pattern normally radiated by upper antenna A' of the basic null type glide path and is identical with the radiation pattern illustrated by Fig. 2A, curve 1. We have found that by locating an antenna C' generally disposed above the basic array comprising antennas A' and B' at preferably three-halves the height above ground of the upper antenna A' and feeding antenna C' sideband energy, an improvement is achieved in the glide path pattern. Radiation signal strength due to antenna C' when its magnitude is adjusted to substantially equal one-half the magnitude of the energy radiated by antenna A' is brought against the elevation angle $\theta$ as shown in Fig. 4A, curve 6. The resulting radiation pattern due to the antenna array of Fig. 3 is illustrated in Fig. 4B, curve 7. It should be noted that the sharpness and clearance below the glide path represented by the magnitude and slope of loop 8 has been greatly increased over that above the desired path as represented by loop 9. Although the desired glide path has been depressed from $\theta_1$ to $\theta_3$, the elevation angle of our improved glide path can never be depressed below $\theta_4$. Thus we have given the glide path a lower elevation angle limit which was not present when the modifier signal was radiated as shown in Figs. 2A and 2B.

Figure 4C:
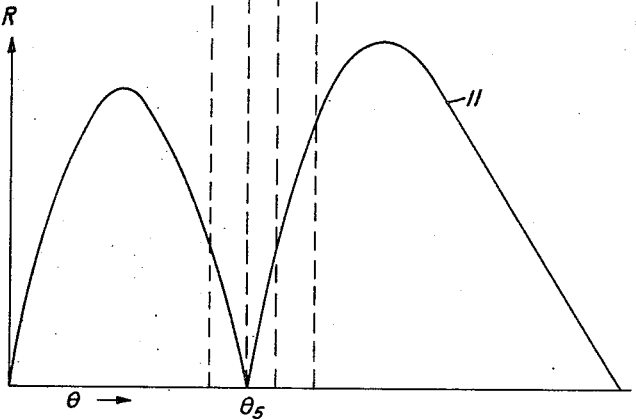

In some situations it may be found desirable to maintain the same maximum clearance above as well as below the predetermined glide path. This result is obtained in accordance with the principles of our invention if the modifier sideband energy is fed to antenna D' as well as to antenna C'. This additional sideband energy fed to antenna D' is represented by curve 10 in Fig. 4B. When this energy is added to the energy represented by curve 7, the total energy pattern due to the antenna array of Fig. 3 is shown in Fig. 4C, curve 11. Curve 11 shows almost identical maximum clearance above as well as below the desired glide path, but the sharpness below the path is still maintained greater than the sharpness above the path due to the more rapid rise of sideband power.

Figure 6A:
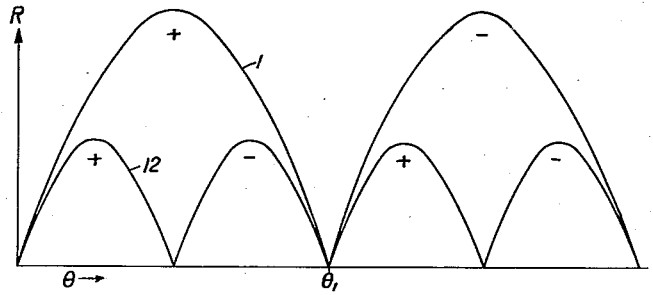
Figure 6B:
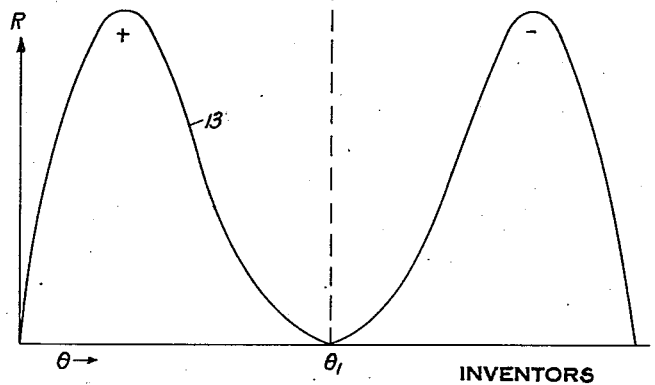

In the past it has been found desirable to soften the glide paths used in instrument landing systems so that the path would not be excessively sharp close to the ground because an airplane's movements are to a slight extent uncontrollable because of the effect of winds and thermal drafts and a sharp glide path pattern would cause rapid fluctuations of the indicator needle when close to the landing field. These rapid fluctuations are difficult to follow, either manually or automatically. We have found that the use of a third antenna generally disposed above the basic array of a null type glide path antenna system (preferably at twice the height of the upper antenna of the basic array) will provide the desired softening of glide path by preserving adequate protection when the aircraft deviates dangerously below the prescribed path. As shown in Fig. 5, antennas A" and B" comprise the basic array of the null type glide path system. Our improvement comprises the addition of antenna C" radiating only sideband energy at a point preferably twice the height above ground as antenna A". Referring to Fig. 6A, curve 1 illustrates the sideband energy path normally obtained from the upper antenna of the basic antenna array of a null type glide path system. The sideband energy radiated by antenna C" is shown by curve 12. The horizontal pattern of the radiation due to antenna C" is adjusted to produce a null at the zero azimuth angle and to increase the strength of radiation as the azimuth angle approaches 90°. Thus the aircraft will receive progressively larger softening signals as it approaches the landing field. Fig. 6B, curve 13 shows the resulting radiation pattern due to the antenna array of Fig. 5 when the magnitude of the sideband energy radiated by antenna C" is approximately one-half the magnitude of the sideband energy radiated by antenna A". It is seen that the sharpness in the immediate vicinity of the glide path angle $\theta_1$ has been greatly reduced. However, if an airplane should deviate dangerously below the path $\theta_1$, there is a very rapid increase in clearance which will cause a rapid deflection in the indicator needle. If the magnitude of the softening energy 12 radiated by antenna C" is increased with respect to the magnitude of the sideband energy radiated by antenna A", the sharpness in the immediate vicinity of the glide path angle decreases while simultaneously the slope of the rise of the glide path pattern of Fig. 6B, curve 13, becomes steeper. Due to the lack of sharpness in the immediate vicinity of the glide path $\theta_1$, a very appreciable softening will take place since slight deviations of the aircraft in the vicinity due to uncontrollable factors will not cause a substantial fluctuation of the indicator. Since the slope of the radiation pattern shown in curve 13 is steep, the total width of the glide path need not be dangerously increased, hence maintaining the same margin of safety insofar as adequate indication is available below the desired glide path.

Fig. 7 is one embodiment of a relatively simple circuit for feeding the antenna structures of Figs. 3 and 5 in accordance with the principles of this invention. A carrier frequency is supplied from a common source 14 and fed to one terminal of a conjugate network 15 of the type disclosed in U. S. Patent No. 2,147,807 to A. Alford. In accordance with the teachings of said patent, network 15 serves to supply equal amounts of carrier energy into two transmission lines 16 and 17 for separate modulation by two radio frequencies of 150 and 90 C. P. S., respectively. Also in accordance with the said patent, this modulation is preferably effected by continuously varying the tuned states of a pair of coupled sections 18 and 19 associated respectively with lines 16 and 17. A cross modulation load 20 is coupled to the terminal of network 15 opposite the input terminal. The carrier energy modulated by the Y cycle signal is then fed from line 18 to one terminal of another conjugate network 21 and the diagonally opposite terminal thereof is similarly connected to line 17 to receive the signal comprising the carrier energy modulated by the Z cycle signal. The other terminals of network 21 are connected respectively to A and B antennas. Between the terminals of network 21 connected to the A antennas and to line 17 there is a phase reversal element 22 for assuring that none of the Y cycle signals will be fed into line 17, and, conversely, that none of the Z cycle signals will be fed into line 16. The energy fed to B antenna comprises the carrier energy modulated by both sidebands whereas the energy coupled out of the diagonally opposite terminal or network 21 to the A antennas comprises only sideband energy. Line 23 couples a portion of the sideband energy from network 21 through an amplitude control 24 to the C antennas. Amplitude control means 24 is provided in line 23 to control the amount of sideband energy radiated from the C antenna with respect to the amount of sideband energy radiated from the A antenna. It is, of course, understood that the embodiment of Fig. 7 is a relatively simple circuit and that additional bridge circuits may be added to prevent any interaction between the energy fed to the C and A antennas.

While we have described above the principles of our invention in connection with specific apparatus, it is to be clearly understood that this description is made only by way of example and not as a limitation to the scope of our invention as set forth in the objects thereof and in the accompanying claims.

We claim:

1. Glide path apparatus for instrument landing of aircraft comprising first antenna means and second antenna means disposed generally above said first antenna means, a source of carrier frequency energy, first means to modulate said carrier frequency energy with a first given frequency, and second means to modulate said carrier frequency energy with a second given frequency to produce sideband energy, means to couple said carrier energy and said sideband energy to said first antenna means, means to couple said sideband energy to said second antenna means, third antenna means disposed generally above said first and second antenna means, and means to couple said sideband energy to said third antenna means.

2. Glide path apparatus according to claim 1, wherein said means to couple sideband energy to said third antenna means further includes means to control the amplitude of said coupled energy relative to the amplitude of the sideband energy coupled to said second antenna means.

3. Glide path apparatus according to claim 1, wherein said means to couple energy to said first and second antenna means includes a conjugate network.

4. Glide path apparatus according to claim 1, wherein said first antenna means is disposed substantially at one-half the height above ground of said second antenna means.

5. Glide path apparatus according to claim 4, wherein said third antenna means is disposed substantially at three-halves the height above ground as said second antenna means.

6. Glide path apparatus according to claim 4, wherein said third antenna means is disposed substantially at twice the height above ground as said second antenna means.

7. Glide path apparatus suitable for instrument landing of aircraft comprising first antenna means, second antenna means disposed generally above said first antenna means, a source of carrier frequency energy, a first conjugate network, means to couple said carrier frequency energy to one terminal of said conjugate network, a cross modulation load coupled to a terminal of said first conjugate network diagonally opposite to the terminal coupled to said carrier frequency energy source, means to modulate each of the outputs from diagonally opposite terminals of said conjugate network with a different modulating frequency signal, a second conjugate network, means to couple said modulated carrier frequency energy to diagonally opposite terminals of said second conjugate network, means coupling said first antenna to an output terminal of said second conjugate network having carrier frequency energy and sideband energy comprising the output and means to couple said second antenna means to the output terminal of said conjugate network having sideband energy, third antenna means disposed generally above said second antenna means, and means coupling said sideband energy output of said second conjugate network to said third antenna means.

8. In a null type glide path system for the instrument landing of aircraft having a basic antenna array including first antenna means radiating carrier and sideband energy and a second antenna means disposed generally above said first antenna means and radiating sideband energy, the method of modifying the glide path pattern comprising the radiation of sideband energy from antenna means disposed generally above said basic array.

References Cited in the file of this patent

UNITED STATES PATENTS

| | | |
|---|---|---|
| 2,379,442 | Kandoian | July 3, 1945 |
| 2,406,876 | Watts | Sept. 3, 1946 |